United States Patent
Li et al.

(10) Patent No.: US 11,611,995 B2
(45) Date of Patent: Mar. 21, 2023

(54) RANDOM ACCESS METHOD, TERMINAL AND NETWORK DEVICE

(71) Applicants: China Mobile Communication Co., Ltd Research Institute, Beijing (CN); China Mobile Communications Group Co., Ltd., Beijing (CN)

(72) Inventors: Nan Li, Beijing (CN); Haiyu Ding, Beijing (CN); Yuhong Huang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 51 days.

(21) Appl. No.: 17/050,904

(22) PCT Filed: Apr. 1, 2019

(86) PCT No.: PCT/CN2019/080774
§ 371 (c)(1),
(2) Date: Oct. 27, 2020

(87) PCT Pub. No.: WO2019/205894
PCT Pub. Date: Oct. 31, 2019

(65) Prior Publication Data
US 2021/0235502 A1    Jul. 29, 2021

(30) Foreign Application Priority Data
Apr. 28, 2018    (CN) .......................... 201810402064.2

(51) Int. Cl.
H04W 74/08    (2009.01)
H04W 76/11    (2018.01)
(Continued)

(52) U.S. Cl.
CPC ... *H04W 74/0833* (2013.01); *H04W 72/0446* (2013.01); *H04W 72/0453* (2013.01); *H04W 76/11* (2018.02)

(58) Field of Classification Search
CPC ......... H04W 74/0833; H04W 72/0446; H04W 72/0453; H04W 76/11; H04W 74/004; H04W 72/0413; H04L 5/00; H04L 5/0053
See application file for complete search history.

(56) References Cited

U.S. PATENT DOCUMENTS

2006/0040702 A1*    2/2006    Willenegger ....... H04W 74/002
455/525
2009/0163211 A1*    6/2009    Kitazoe ............... H04W 74/004
455/436
(Continued)

FOREIGN PATENT DOCUMENTS

CN    101222756 A    7/2008
CN    101674661 A    3/2010
(Continued)

OTHER PUBLICATIONS

Chinese Written Opinion of the International Searching Authority dated Nov. 12, 2020 for PCT/CN2019/080774, 7 pages.
(Continued)

*Primary Examiner* — Thai Nguyen
(74) *Attorney, Agent, or Firm* — Morgan, Lewis & Bockius LLP (57) ABSTRACT

A random access method, a terminal and a network device are provided. The random access method includes: sending a random access request carrying a first identifier, or sending a random access request and a first identifier.

16 Claims, 3 Drawing Sheets

Sending a random access request carrying a first identifier, or sending a random access request and a first identifier — 11

Receiving a random access response, wherein the random access response carries a second identifier — 12

(51) Int. Cl.
*H04W 72/0446* (2023.01)
*H04W 72/0453* (2023.01)

(56) References Cited

U.S. PATENT DOCUMENTS

| | | | | |
|---|---|---|---|---|
| 2012/0093102 | A1* | 4/2012 | Zhang | H04W 74/002 370/329 |
| 2016/0135236 | A1 | 5/2016 | Xhu et al. | |
| 2016/0309370 | A1 | 10/2016 | Narasimha et al. | |
| 2020/0045749 | A1 | 2/2020 | Jiang | |

FOREIGN PATENT DOCUMENTS

| | | |
|---|---|---|
| CN | 106899964 A | 6/2017 |
| CN | 107113806 A | 8/2017 |
| CN | 107223353 A | 9/2017 |
| CN | 107360629 A | 11/2017 |
| WO | WO-2009110716 A2 * | 9/2009 ........ H04W 74/006 |
| WO | WO-2010016726 A2 * | 2/2010 ........ H04L 1/1822 |
| WO | WO 2014/205681 A1 | 12/2014 |
| WO | WO 2016/131182 A1 | 8/2016 |

OTHER PUBLICATIONS

International Preliminary Report on Patentability with Written Opinion (in English) dated Nov. 12, 2020 for PCT/CN2019/080774, 5 pages.
Chinese Office Action (First) dated Sep. 27, 2020, for Chinese Patent Application No. 201810402064.2, 11 pages.
English Translation of Chinese Office Action (First) dated Sep. 27, 2020, for Chinese Patent Application No. 201810402064.2, 13 pages.
Chinese Office Action (Second) dated Feb. 1, 2021, for Chinese Patent Application No. 201810402064.2, 11 pages.
English Translation of Chinese Office Action (Second) dated Feb. 1, 2021, for Chinese Patent Application No. 201810402064.2, 13 pages.

* cited by examiner

RANDOM ACCESS METHOD, TERMINAL AND NETWORK DEVICE

CROSS-REFERENCE TO RELATED APPLICATION

This application is a U.S. national phase application of a PCT Application No. PCT/CN2019/080774 filed on Apr. 1, 2019, which claims a priority of the Chinese patent application No. 201810402064.2 filed in China on Apr. 28, 2018, a disclosure of which is incorporated herein by reference in its entirety.

TECHNICAL FIELD

The present disclosure relates to the field of communications application technologies, and in particular, relates to a random access method, a terminal and a network device.

BACKGROUND

In the related art, a random access of 4G systems is divided into two types: a contention-based random access and a non-contention-based random access. At least four steps are required for a terminal and a network device to realize the contention-based random access. In a 5G era, on one hand, requirements for service delay are getting higher and higher, and it is necessary to provide users with services more quickly, and reducing a time delay of the random access is an important requirement; on the other hand, due to diversity of types of terminals and with penetration rate and user density being increased, there will be more and more frequent requests for the contention-based random access within the network device. It is necessary to reduce a signaling overhead of the random access, and to find a more efficient contention-based random access method.

SUMMARY

An objective of the present disclosure is to provide a random access method, a terminal, and a network device, so as to solve problems of a long time delay and a large signaling overhead existing in a random access method in the related art.

A random access method includes: sending a random access request carrying a first identifier, or sending a random access request and a first identifier.

The first identifier is obtained by calculating a terminal identifier and/or first information according to a first algorithm; the first information includes a first field and/or a second field.

The first field or the second field is a fixed-length or variable-length field; or the second field is a padding value of a preset numeration system.

The first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

Optionally, the first identifier is a first calculation value or a part of a first calculation value, wherein the first calculation value includes a second calculation value and first information, and the second calculation value is obtained by calculating a terminal identifier or partial information about a terminal identifier according to a first algorithm.

The first algorithm includes one of a one-way function algorithm, a hash function algorithm, or an elliptic function algorithm.

Optionally, the first information includes a first field and/or a second field; the first field or the second field is a fixed-length or variable-length field; or the second field is a padding value of a preset numeration system.

The first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

Subsequent to sending the random access request carrying the first identifier, or sending the random access request and the first identifier, the random access method further includes: receiving a random access response, wherein the random access response carries a second identifier.

Receiving the random access response includes: receiving indicator information of a random access request response resource; receiving a random access request response at a resource location indicated by the indicator information of the random access request response resource.

The second identifier is an identifier selected by a network device from received at least one first identifier sent by at least one terminal.

Subsequent to receiving the random access response, the random access method further includes: determining that the random access request is successful in a case that the first identifier is the same as the second identifier.

Subsequent to receiving the random access response, the random access method further includes: sending a terminal identifier and/or second information; wherein the second information includes a first field and/or a second field; the first field includes at least one of: algorithm identifier information of a first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

The second field is a padding value of a preset numeration system used when determining the first identifier.

Subsequent to receiving the random access response, the random access method further includes: receiving a connection setup complete message or a random access request success message; or, receiving a connection setup failure message or a random access request failure message.

An embodiment of the present disclosure further provides a random access method, and the method includes: receiving a random access request carrying a first identifier, or receiving a random access request and a first identifier; sending a random access response, wherein the random access response carries a second identifier.

The second identifier is an identifier selected by a network device from received at least one first identifier sent by at least one terminal.

Subsequent to receiving the random access request carrying the first identifier, or receiving the random access request and the first identifier, the random access method further includes: sending indicator information of a random access request response resource; wherein the indicator information is used to instruct a terminal to receive a random access request response at a resource location indicated by the indicator information.

Subsequent to sending the random access response, the random access method further includes: receiving a terminal identifier and/or second information sent by a terminal; wherein the second information includes a first field and/or a second field; the first field includes at least one of: algorithm identifier information of a first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier; the second field is a padding value of a preset numeration system used when determining the first identifier.

Subsequent to receiving the terminal identifier and/or the second information sent by the terminal, the random access method further includes: obtaining a third identifier; sending a connection setup complete message or a random access request success message in a case that the third identifier is the same as the second identifier.

Subsequent to receiving the terminal identifier and/or the second information sent by the terminal, the random access method further includes: obtaining a third identifier; sending a connection setup failure message or a random access request failure message in a case that the third identifier is different from the second identifier.

Obtaining the third identifier includes: performing, according to a first algorithm, calculation on the terminal identifier and/or the second information to obtain the third identifier; the first algorithm includes one of a one-way function algorithm, a hash function algorithm, or an elliptic function algorithm.

Content of the second field in the second information used when the third identifier is obtained is the same as content of the second field in first information used when the terminal obtains the first identifier.

Subsequent to sending the connection setup complete message or the random access request success message, the random access method further includes: reporting the terminal identifier and/or the second information to a core network.

An embodiment of the present disclosure further provides a random access method, and the method includes: sending, by a terminal, a random access request carrying a first identifier, or sending, by a terminal, a random access request and a first identifier; receiving, by a network device, the random access request carrying the first identifier, or receiving, by a network device, the random access request and the first identifier; sending, by the network device, a random access response, wherein the random access response carries a second identifier; receiving, by the terminal, the random access response.

An embodiment of the present disclosure further provides a terminal, and the terminal includes: a transceiver, used to send a random access request carrying a first identifier, or send a random access request and a first identifier.

The first identifier is obtained by calculating a terminal identifier and/or first information according to a first algorithm; the first information includes a first field and/or a second field.

The first field or the second field is a fixed-length or variable-length field; or The second field is a padding value of a preset numeration system.

The first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

Optionally, the first identifier is a first calculation value or a part of a first calculation value, wherein the first calculation value includes a second calculation value and first information, and the second calculation value is obtained by calculating a terminal identifier or partial information about a terminal identifier according to a first algorithm.

The first algorithm includes one of a one-way function algorithm, a hash function algorithm, or an elliptic function algorithm.

Optionally, the first information includes a first field and/or a second field; the first field or the second field is a fixed-length or variable-length field; or the second field is a padding value of a preset numeration system.

The first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

The transceiver is further used to: receive a random access response, wherein the random access response carries a second identifier.

The transceiver is further used to: receive indicator information of a random access request response resource; receive a random access request response at a resource location indicated by the indicator information of the random access request response resource.

The second identifier is an identifier selected by a network device from received at least one first identifier sent by at least one terminal.

The terminal further includes: a processor, used to determine that the random access request is successful in a case that the first identifier is the same as the second identifier.

The transceiver is further used to: send a terminal identifier and/or second information; the second information includes a first field and/or a second field; the first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier; the second field is a padding value of a preset numeration system used when determining the first identifier.

The transceiver is further used to: receive a connection setup complete message or a random access request success message; or, receive a connection setup failure message or a random access request failure message.

An embodiment of the present disclosure further provides a network device, and the network device includes: a transceiver, used to receive a random access request carrying a first identifier, or receive a random access request and a first identifier; send a random access response, wherein the random access response carries a second identifier.

The second identifier is an identifier selected by a network device from received at least one first identifier sent by at least one terminal.

The transceiver is further used to: send indicator information of a random access request response resource; wherein the indicator information is used to instruct a terminal to receive a random access request response at a resource location indicated by the indicator information.

The transceiver is further used to: receive a terminal identifier and/or second information sent by a terminal; the second information includes a first field and/or a second field; the first field includes at least one of algorithm identifier information of a first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier; the second field is a padding value of a preset numeration system used when determining the first identifier.

The network device further includes: a processor, used to obtain a third identifier; send a connection setup complete message or a random access request success message through the transceiver in a case that the third identifier is the same as the second identifier.

The network device further includes: a processor, used to obtain a third identifier; send a connection setup failure message or a random access request failure message through the transceiver in a case that the third identifier is different from the second identifier.

The processor is used to perform, according to a first algorithm, calculation on the terminal identifier and/or the second information to obtain the third identifier; the first algorithm includes one of a one-way function algorithm, a hash function algorithm, or an elliptic function algorithm.

Content of the second field in the second information used when the third identifier is obtained is the same as content of the second field in first information used when the terminal obtains the first identifier.

The transceiver further used to report the terminal identifier and/or the second information to a core network.

An embodiment of the present disclosure further provides a communication device, the communication device includes a processor and a storage storing a computer program. When the computer program is executed by the processor, the processor performs the method as described above.

An embodiment of the present disclosure further provides a computer readable storage medium including an instruction, when the instruction is executed on a computer, the computer is caused to perform the method as described above.

The above technical solutions of the present disclosure have at least the following beneficial effects.

In above solutions of an embodiment of the present disclosure, a terminal sends to a network device a random access request carrying a first identifier, or sends a random access request and a first identifier, random access is performed through the above first identifier, which reduces an interaction process between the terminal and the network device, saves a signaling overhead, and shortens a time delay.

DETAILED DESCRIPTION

Exemplary embodiments of the present disclosure will be described in more detail below with reference to the accompanying drawings. Although exemplary embodiments of the present disclosure are shown in the drawings, it should be understood that the present disclosure may be implemented in various forms, without being limited by the embodiments described herein. Rather, these embodiments are provided so that the present disclosure will be understood more thoroughly, and will fully convey the scope of the present disclosure to those skilled in the art.

Figure 1:
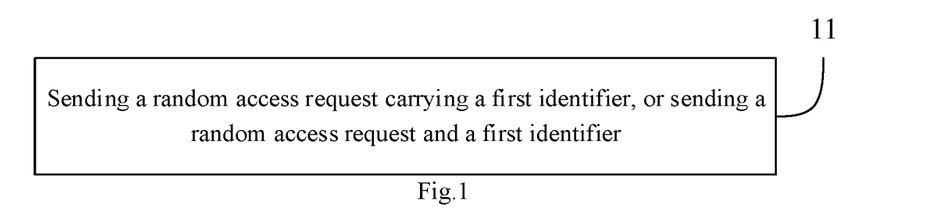
FIG. 1 is a flowchart of a random access method according to an embodiment of the present disclosure.

As shown in FIG. 1, an embodiment of the present disclosure provides a random access method applied to a terminal, and the random access method includes a step 11.

Step 11: sending a random access request carrying a first identifier, or sending a random access request and a first identifier.

In a specific embodiment of the present disclosure, a terminal sends a random access request carrying a first identifier to a network device, or a terminal sends a random access request and a first identifier to a network device.

The first identifier is obtained by the terminal through performing, according to a first algorithm, calculation on a terminal identifier and/or first information. The first information includes a first field and/or a second field.

The first field or the second field is a fixed-length or variable-length field; or the second field is a padding value of a preset numeration system.

The first field specifically includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

Optionally, the first identifier is a first calculation value or a part of a first calculation value, wherein the first calculation value includes a second calculation value and first information, and the second calculation value is obtained by calculating a terminal identifier or partial information about a terminal identifier according to a first algorithm.

The first algorithm includes, but is not limited to, one of a one-way function algorithm (such as a hash (HASH) algorithm), a hash function algorithm, or an elliptic function algorithm.

The one-way function algorithm, the hash function algorithm, and the elliptic function algorithm have the following characteristics: 1) irreversibility, an input value cannot be inferred from an output value, so that input-end data may be effectively protected; 2) different input values will not produce a same output value, which may guarantee uniqueness of an outputted result; 3) randomness of the output value and the input value, the output value that meets a requirement may only be obtained through random methods. The present disclosure effectively utilizes the above three characteristics of the one-way function algorithm, the hash function algorithm and the elliptic function algorithm, and specific application manners are as follows:

1) the irreversible characteristic: since the one-way function algorithm, the hash function algorithm and the elliptic function algorithm are irreversible, even if a pseudo base station intercepts an identifier, obtained by the terminal through performing calculation using a real identifier of the terminal and/or first information, included in a random access request of the terminal, the pseudo base station cannot reversely calculate the real identifier of the terminal, such as an International Mobile Subscriber Identification Number (IMSI), an International Mobile Equipment Identity (IMEI) or a Temporary Mobile Subscriber Identification Number (TMSI), which may provide effective protection measures for security of the terminal;

2) uniqueness of the outputted result: since a real identifier of the terminal, such as an IMSI, or a real identifier of a mobile device is network-wide unique, the real identifier may be used as one of input values or an input value of the one-way function algorithm, the hash function algorithm and the elliptic function algorithm, and the network-wide unique identifier (terminal code) may be obtained, which may avoid a conflict when the terminal sends a random access request in the same time domain, the same frequency domain, and the same code domain during a random access request process in the related art, and a four-step random access procedure in the related art is changed to a two-step random access procedure, effectively improving access efficiency;

3) randomness: another feature of algorithms, such as the one-way function, the hash function and the elliptic function, is that there is no fixed correlation between an input value and an output value, and the output value is randomly generated. Therefore, even if the terminal knows an identifier corresponding to a random access request response sent by the network, the terminal cannot obtain a corresponding answer through a pseudo-random method. The network device may verify, according to all or part of input parameters in the first information provided by the terminal to calculate a limit value, legality of the limit value. When partial information for calculating the limit value, such as a time-domain resource, a frequency-domain resource, or a code-domain resource used to send a random access request, is obtainable by the network device according to a received random access request, the first information reported by the terminal for verification service only needs to include other input information and values in addition to the above information.

Figure 2:
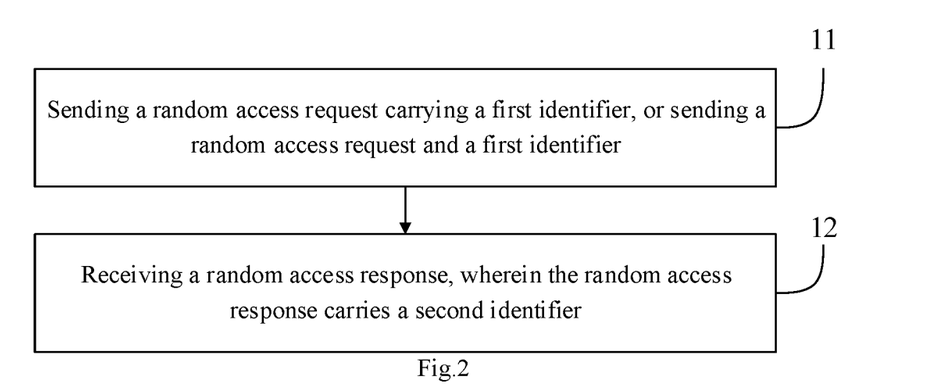
FIG. 2 is another flowchart of a random access method according to an embodiment of the present disclosure.

Further, as shown in FIG. 2, subsequent to sending the random access request carrying the first identifier, or sending the random access request and the first identifier in Step 11, the method further includes a step 12.

Step 12: receiving a random access response, wherein the random access response carries a second identifier.

Here, a terminal receives a random access response sent by a network device according to a random access request carrying a first identifier, or a terminal receives a random access response sent by a network device according to a random access request and a first identifier.

The second identifier is an identifier selected by a network device from received at least one first identifier sent by at least one terminal, and a terminal corresponding to the second identifier is a terminal that the network device allows to access to.

Further, subsequent to receiving the random access response in Step 12, the method further includes: determining that the random access request is successful in a case that the first identifier is the same as the second identifier.

In an embodiment of the present disclosure, the terminal provides one piece of network-wide unique identifier information (the first identifier) to the network, and the network selects one piece of identifier information (the second identifier), the piece of identifier information is included in a random access response, and a handshake protocol of a random access request is completed. Subsequently the terminal judges whether random access of the terminal is successful, and data is sent if the random access is successful, so that two steps related to conflict response resolution in related art are omitted, a signaling overhead is saved and a time delay is reduced as well.

Further, receiving the random access response in Step 12 includes: receiving indicator information of a random access request response resource; receiving a random access request response at a resource location indicated by the indicator information of the random access request response resource.

Here, the indicator information of the random access request response resource is obtained by the network device through firstly calculating a time-frequency resource location, at which the terminal initiates a random access request, to obtain a value, and then scrambling the value.

Further, subsequent to receiving the random access response in Step 12, the method further includes: sending a terminal identifier and/or second information.

The second information includes a first field and/or a second field.

The first field includes at least one of: algorithm identifier information of a first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

The second field is a padding value of a preset numeration system used when determining the first identifier.

Here, the terminal sends the terminal identifier and/or the second information to the network device, so that the network device uses the first algorithm to calculate for the terminal identifier and/or the second information to obtain the third identifier, and authenticates the terminal by comparing the third identifier with the second identifier, so as to prevent a terminal from cheating and preempting random access resources.

Further, subsequent to receiving the random access response in Step 12, the method further includes: receiving a connection setup complete message or a random access request success message sent by the network device; or, receiving a connection setup failure message or a random access request failure message.

In a specific embodiment of the present disclosure, if the first identifier is directly calculated based on the terminal identifier or calculated based on a combination of the terminal identifier and information known by the network device, such as information corresponding to a time-domain resource location, a frequency-domain resource location or a code-domain resource location used by the terminal to initiate a random access request, then in this case, there is no need for the terminal to report additional auxiliary information to the network device to assist the network device in verifying legality of the terminal identifier. If the first identifier is calculated based on a random value or based on an IMSI and a padding field (that is, the first identifier is calculated based on information unknown to the network device), then the padding field or the random value are additionally reported in a case that the terminal reports the terminal identifier, so that the network device obtains a third identifier according to the padding field or the random value reported by the terminal, and compares the third identifier with the second identifier. A connection setup complete message or a random access request success message is sent to the terminal in a case that the third identifier and the second identifier are the same; the network device sends a connection setup failure message or a random access request failure message to the terminal in a case that the third identifier and the second identifier are different.

In a random access method of an embodiment of the present disclosure, random access is performed through the above first identifier, which reduces an interaction process between the terminal and the network device, saves a signaling overhead, and reduces a time delay, and the real identifier of the terminal may be effectively protected by using irreversible characteristic of a one-way function algorithm, a hash function algorithm or an elliptic function algorithm.

Figure 3:
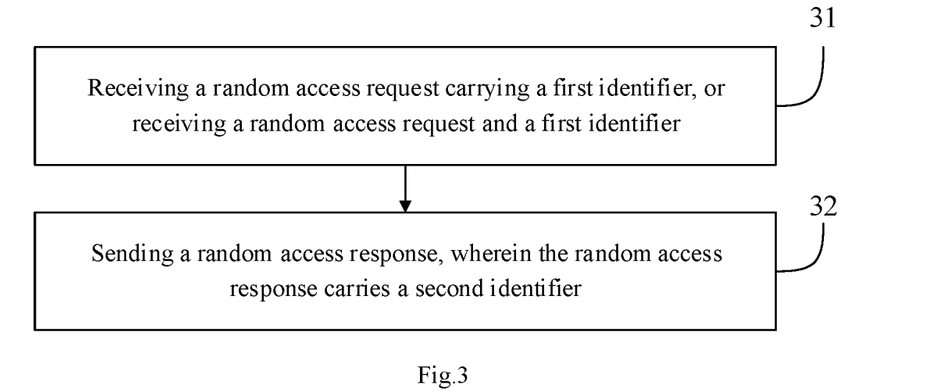
FIG. 3 is yet another flowchart of a random access method according to an embodiment of the present disclosure.

As shown in FIG. 3, an embodiment of the present disclosure further provides a random access method applied to a network device, and the method includes a step 31 and a step 32.

Step 31: receiving a random access request carrying a first identifier, or receiving a random access request and a first identifier.

A network device receives a random access request carrying a first identifier sent by a terminal, or a network device receives a random access request and a first identifier sent by a terminal.

The first identifier is calculated by the terminal on a terminal identifier and/or first information according to a first algorithm; the first information includes a first field and/or a second field.

The first field or the second field is a fixed-length or variable-length field; or the second field is a padding value of a preset numeration system.

The first field specifically includes at least one of: algorithm identifier information of a first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

The first algorithm includes, but is not limited to, one of: a one-way function algorithm (such as a HASH algorithm), a hash function algorithm, or an elliptic function algorithm.

Since the one-way function algorithm, the hash function algorithm and the elliptic function algorithm are irreversible, even if a pseudo base station intercepts an identifier of the terminal included in a random access request of the terminal, the pseudo base station cannot reversely calculate the real identifier of the terminal, such as an International Mobile Subscriber Identification Number (IMSI), an International Mobile Equipment Identity (IMEI) or Temporary Mobile Subscriber Identification Number (TMSI), which may provide effective protection measures for security of the terminal.

Step 32: sending a random access response, wherein the random access response carries a second identifier.

The network device sends a random access response carrying a second identifier to the terminal, so that the terminal determines that the random access is successful in a case that the first identifier is the same as the second identifier.

The second identifier is an identifier selected by a network device from received at least one first identifier sent by at least one terminal, and a terminal corresponding to the second identifier is a terminal that the network device is allowed to access.

In an embodiment of the present disclosure, the terminal provides one piece of network-wide unique identifier information (the first identifier) to the network, and the network selects one piece of identifier information (the second identifier), the piece of identifier information is included in a random access response, and a handshake protocol of a random access request is completed. Subsequently the terminal judges whether random access of the terminal is successful, and data is sent if the access is successful, so that two steps related to conflict response resolution in related art are omitted, a signaling overhead is saved and a time delay is reduced as well.

Further, subsequent to receiving the random access request carrying the first identifier, or receiving the random access request and the first identifier in Step 31, the method further includes: sending indicator information of a random access request response resource; wherein the indicator information is used to instruct a terminal to receive a random access request response at a resource location indicated by the indicator information.

Here, the indicator information of the random access request response resource is obtained by the network device through firstly calculating a time-frequency resource location, at which the terminal initiates a random access request, to obtain a value, and then scrambling the value.

In a random access method of an embodiment of the present disclosure, a network device receives a random access request carrying a first identifier sent by a terminal or receives a random access request and a first identifier sent by a terminal; a random access response is sent to the terminal, where the random access response carries a second identifier, so that the terminal determines that the random access is successful in a case that the first identifier and the second identifier are the same. In an embodiment of the present disclosure, random access is performed through the above first identifier, which reduces an interaction process between the terminal and the network device, saves a signaling overhead, and reduces a time delay.

Further, subsequent to sending the random access response in Step 32, the method further includes: receiving a terminal identifier and/or second information sent by a terminal.

The second information includes a first field and/or a second field.

The first field includes at least one of: algorithm identifier information of a first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

The second field is a padding value of a preset numeration system used when determining the first identifier.

Further, subsequent to receiving the terminal identifier and/or the second information sent by the terminal, the method further includes: obtaining a third identifier; sending a connection setup complete message or a random access request success message in a case that the third identifier is the same as the second identifier.

Further, subsequent to receiving the terminal identifier and/or the second information sent by the terminal, the method further includes: obtaining a third identifier; sending a connection setup failure message or a random access request failure message in a case that the third identifier is different from the second identifier.

Obtaining the third identifier includes: performing, according to a first algorithm, calculation on the terminal identifier and/or the second information to obtain the third identifier; wherein the first algorithm includes one of a one-way function algorithm, a hash function algorithm, or an elliptic function algorithm.

Further, content of the second field in the second information used when the third identifier is obtained is the same as content of the second field in the first information used when the terminal obtains the first identifier.

In a specific embodiment of the present disclosure, if the first identifier is calculated by using the second field in the first information, the network device uses the same content of the second field for calculation when the third identifier is calculated. In an embodiment of the present disclosure, it is difficult to use a one-way function, a hash function and an elliptic function to calculate a value that meets a specific condition (it takes hundreds of millions or more hash operations to obtain a calculation result that meets a specific condition). However, using a characteristic that verification of a result is very simple when an algorithm and an input value are known (the known algorithm and the known input value may verify the authenticity of the result through a one-time calculation), it may effectively prevent a phenomenon of terminal cheating and preempting resources during a two-step random access.

Further, subsequent to sending the connection setup complete message or the random access request success message, the method further includes: reporting the terminal identifier and/or the second information to a core network.

If the terminal sends a terminal identifier to the network device, then after the network device sends a connection setup complete message or a random access request success message, the terminal identifier is reported to the core network; if the terminal sends the second information to the network device, then after the network device sends a connection setup complete message or a random access request success message, the second information is reported to the core network; if the terminal sends the terminal identifier and the second information to the network device, then after the network device sends a connection setup complete message or the random access request success message, the terminal identifier and the second information are reported to the core network.

In a specific embodiment of the present disclosure, if the first identifier is directly calculated based on the terminal identifier or calculated based on a combination of the terminal identifier and information known by the network device, such as information corresponding to a time-domain resource location, a frequency-domain resource location or a code-domain resource location used by the terminal to initiate a random access request, then in this case, there is no need for the terminal to report additional auxiliary information to the network device to assist the network device in verifying legality of the terminal identifier. If the first identifier is calculated based on a random value or based on an IMSI and a padding field (that is, the first identifier is calculated based on information unknown to the network device), then the padding field or the random value are additionally reported in a case that the terminal reports the terminal identifier, so that the network device obtains a third identifier according to the padding field or the random value reported by the terminal, and compares the third identifier with the second identifier to authenticate the terminal to prevent the terminal from cheating and preempting random access resources.

Figure 4:
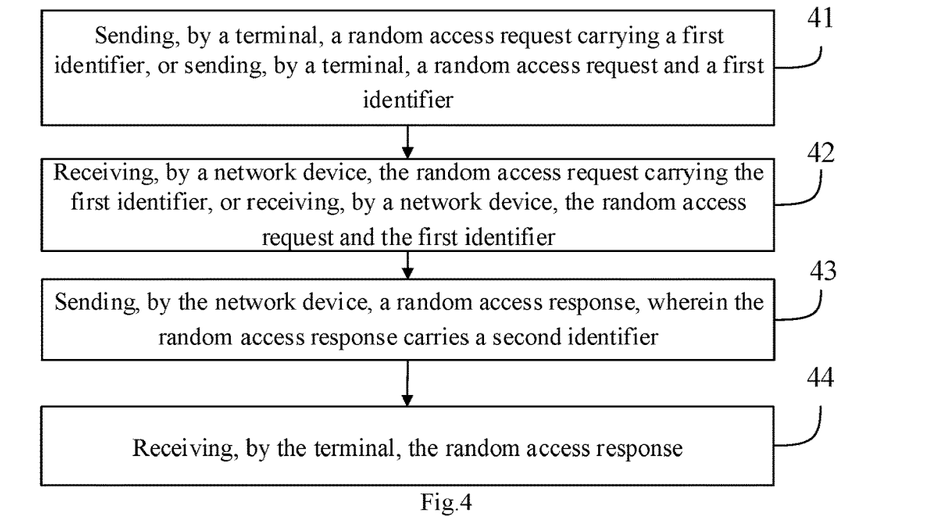
FIG. 4 is still another flowchart of a random access method according to an embodiment of the present disclosure.

As shown in FIG. 4, a specific process of a random access method according to an embodiment of the present disclosure includes steps 41-44.

Step 41: sending, by a terminal, a random access request carrying a first identifier, or sending, by a terminal, a random access request and a first identifier.

Step 42: receiving, by a network device, the random access request carrying the first identifier, or receiving, by a network device, the random access request and the first identifier.

Step 43: sending, by the network device, a random access response, wherein the random access response carries a second identifier.

Step 44: receiving, by the terminal, the random access response.

In an embodiment of the present disclosure, the terminal provides one piece of network-wide unique identifier information (the first identifier) to the network, and the network selects one piece of identifier information (the second identifier), the piece of identifier information is included in a random access response, and a handshake protocol of a random access request is completed. Subsequently the terminal judges whether random access of the terminal is successful, and data is sent if the random access is successful, so that two steps related to conflict response resolution in related art are omitted, a signaling overhead is saved and a time delay is reduced as well.

It should be noted that, all the methods and implementation processes at the foregoing terminal side and all the methods and implementation processes at the network device, are applicable to the present embodiment, and the same technical effects may also be achieved.

Figure 5:
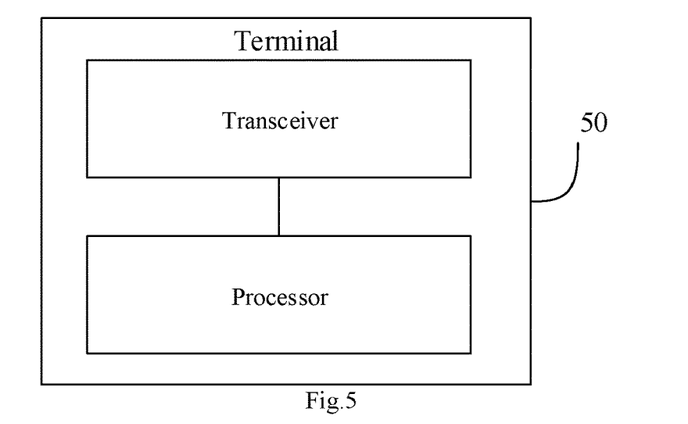
FIG. 5 is a schematic structural diagram of a terminal of the present disclosure.

As shown in FIG. 5, an embodiment of the present disclosure further provides a terminal 50, the terminal 50 includes: a transceiver, used to send a random access request carrying a first identifier, or send a random access request and a first identifier.

The first identifier is obtained by calculating a terminal identifier and/or first information according to a first algorithm. The first information includes a first field and/or a second field.

The first field or the second field is a fixed-length or variable-length field; or the second field is a padding value of a preset numeration system.

The first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

Optionally, the first identifier is a first calculation value or a part of a first calculation value, wherein the first calculation value includes a second calculation value and first information, and the second calculation value is obtained by calculating a terminal identifier or partial information about a terminal identifier according to a first algorithm.

The first algorithm includes one of a one-way function algorithm, a hash function algorithm, or an elliptic function algorithm.

The transceiver is further used to: receive a random access response, wherein the random access response carries a second identifier.

The transceiver is further used to: receive indicator information of a random access request response resource; receive a random access request response at a resource location indicated by the indicator information of the random access request response resource.

The second identifier is an identifier selected by a network device from received at least one first identifier sent by at least one terminal.

The terminal further includes: a processor, used to determine that the random access request is successful in a case that the first identifier is the same as the second identifier.

The transceiver is further used to: send a terminal identifier and/or second information.

The second information includes a first field and/or a second field.

The first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

The second field is a padding value of a preset numeration system used when determining the first identifier.

The transceiver is further used to: receive a connection setup complete message or a random access request success message sent by the network device; or, receive a connection setup failure message or a random access request failure message.

In summary, in a random access method of an embodiment of the present disclosure, a terminal sends a random access request carrying a first identifier to a network device, or sends a random access request and a first identifier, random access is performed through the above first identifier, which reduces an interaction process between the terminal and the network device, saves a signaling overhead, and reduces a time delay.

It should be noted that the terminal provided in an embodiment of the present disclosure is a terminal capable of performing the random access method, then all the embodiments of the random access method applied at a terminal side are applicable to the terminal, and the same or similar technical effect may be achieved. Furthermore, in an embodiment of the terminal, the terminal may further include a storage, the transceiver and the processor are communicatively connected via a bus interface or an interface, and the transceiver and the storage may also be communicatively connected via a bus interface or an interface. The functions of the above transceiver may also be implemented by the processor. The terminal of the present disclosure may also include other components that implement the above method, such as a user interface.

Figure 6:
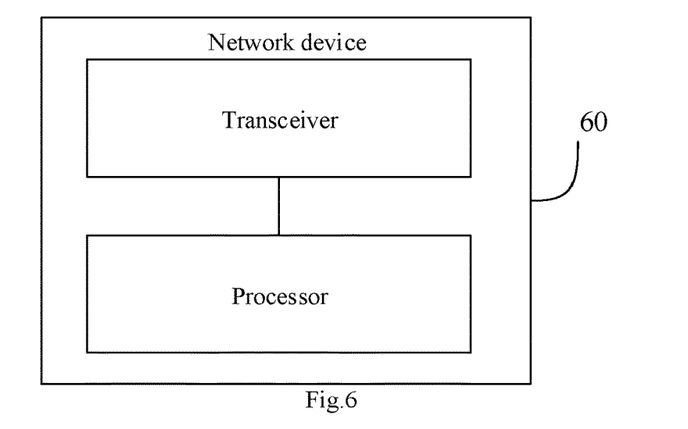
FIG. 6 is a schematic structural diagram of a network device of the present disclosure.

As shown in FIG. 6, an embodiment of the present disclosure further provides a network device 60, and the network device 60 includes: a transceiver, used to receive a random access request carrying a first identifier, or receive a random access request and a first identifier; send a random access response, wherein the random access response carries a second identifier.

The second identifier is an identifier selected by a network device from received at least one first identifier sent by at least one terminal.

The transceiver is further used to: send indicator information of a random access request response resource; wherein the indicator information is used to instruct a terminal to receive a random access request response at a resource location indicated by the indicator information.

The transceiver is further used to: receive a terminal identifier and/or second information sent by a terminal.

The second information includes a first field and/or a second field.

The first field includes at least one of: algorithm identifier information of the first algorithm used when determining the first identifier, time-domain resource information for sending a random access request, a time-domain resource numbering value for sending a random access request, frequency-domain resource information for sending a random access request, a frequency-domain resource numbering value for sending a random access request, preamble information for sending a random access request, a preamble numbering value for sending a random access request, or a network identifier.

The second field is a padding value of a preset numeration system used when determining the first identifier.

The network device in the embodiment of the present disclosure further includes: a processor, used to obtain a third identifier; send a connection setup complete message or a random access request success message through the transceiver in a case that the third identifier is the same as the second identifier.

The network device in the embodiment of the present disclosure further includes: a processor, used to obtain a third identifier; send a connection setup failure message or a random access request failure message through the transceiver in a case that the third identifier is different from the second identifier.

The processor is used to perform, using a first algorithm, calculation on the terminal identifier and/or the second information to obtain the third identifier.

The first algorithm includes one of a one-way function algorithm, a hash function algorithm, or an elliptic function algorithm.

Content of the second field in the second information used when the third identifier is obtained is the same as content of the second field in first information used when the terminal obtains the first identifier.

In the network device in the embodiment of the present disclosure, the transceiver further used to report the terminal identifier and/or the second information to a core network.

It should be noted that the network device provided in an embodiment of the present disclosure is a network device capable of performing the random access method, then all the embodiments of the random access method applied at a network device are applicable to the network device, and the same or similar technical effect may be achieved. Furthermore, in the embodiment of the network device, the network device may further include a storage, the transceiver and the processor are communicatively connected via a bus interface or an interface, and the transceiver and the storage may also be communicatively connected via a bus interface or an interface. The functions of the above transceiver may also be implemented by the processor.

Figure 7:
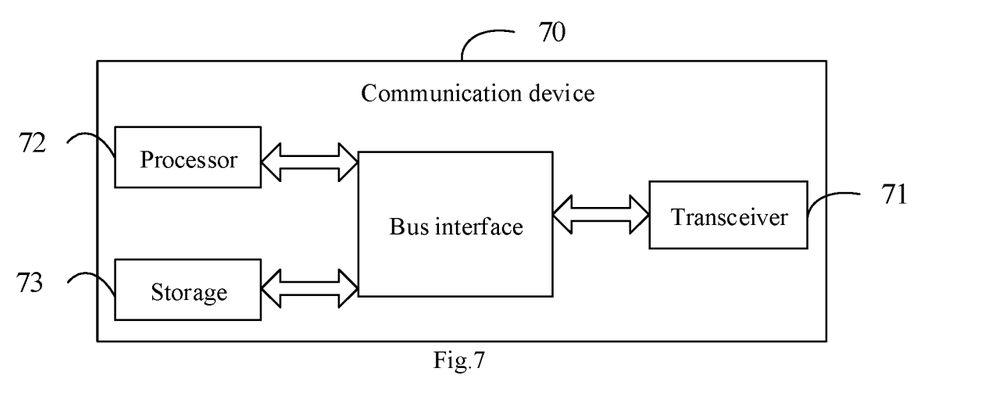
FIG. 7 is a schematic structural diagram of a communication device of the present disclosure.

As shown in FIG. 7, a communication device 70 of the present disclosure includes a processor 72 and a storage 73 storing a computer program. When the computer program is executed by the processor 72, the processor 72 performs the method described in the above embodiments.

It should be noted that the communication device may be the above network device or the above terminal. The communication device may also include a transceiver 71, which is communicatively connected to the processor 72 via a bus interface or an interface, and the transceiver 71 and the storage 73 may also be communicatively connected via a bus interface or an interface. The functions of the above transceiver may also be implemented by the processor. The communication device of the present disclosure may also include other components that implement the above methods, and all implementation manners in the above method embodiments are applicable to the embodiment of the communication device, and may also achieve the same technical effect. The communication device may be the terminal described in the foregoing embodiments, or may be the network device described in the foregoing embodiments, such as a base station.

An embodiment of the present disclosure further provides a computer readable storage medium including an instruction, when the instruction is run on a computer, the computer is caused to perform the method as described above.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to go beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In embodiments provided in the present application, it should be understood that the disclosed devices and methods may be implemented in other manners. For example, the device embodiments described above are merely illustrative. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed across multiple network units. Some or all of the units may be selected based on actual needs to achieve the purpose of the technical solutions of the embodiments.

In addition, various functional units in various embodiments of the present disclosure may be integrated into one processing unit, or each unit may exist physically separately, or two or more units may be integrated into one unit.

If the functions are implemented in the form of software functional units and sold or used as an independent product, the software functional units may also be stored in a computer readable storage medium. Based upon such understanding, the technical solutions of the present disclosure essentially or a part thereof contributing to the prior art or a part of the technical solutions may be embodied in the form of a computer software product which may be stored in a storage medium and which includes several instructions to cause a computer device (which may be a personal computer, a server, or a network device, etc.) to perform all or some steps of the method according to the respective embodiments of the present disclosure. The foregoing storage medium includes various media, such as a USB flash drive, a mobile hard disk, a ROM, a RAM, a magnetic disk, or an optical disk, that may store program codes.

In addition, it should be noted that in the device and the method of the present disclosure, it is apparent that various components or various steps may be decomposed and/or recombined. The decomposition and/or recombination should be considered as equivalent solutions of the present disclosure. Also, the steps of performing the above-described series of processes may naturally be performed in a chronological order or in an order illustrated, but not necessarily be required to be performed in a chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or a computing device network, in forms of hardware, firmware, software, or a combination thereof, which may be implemented by these of ordinary skills in the art using their basic programming skills after reading the description of the present disclosure.

Accordingly, the objects of the present disclosure may also be achieved by running a program or a set of programs on any computing device. The computing device may be a well-known general purpose device. Accordingly, the objects of the present disclosure may also be realized by merely providing a program product including a program code for implementing the method or device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, it is apparent that various components or steps may be decomposed and/or recombined. The decomposition and/or recombination should be considered as equivalent solutions of the present disclosure. Also, the steps of performing the series of processes described above may naturally be performed in the chronological order in the order illustrated, but not necessarily be required to be performed in the chronological order. Certain steps may be performed in parallel or independently of one another.

The descriptions above are optional embodiments of the present disclosure, it should be noted that improvements and embellishments may be made by one skilled in the art within the scope of the tenets of the present disclosure, and such improvements and embellishments shall be within the protection scope of the present disclosure.

What is claimed is:

1. A random access method applied to a terminal, comprising:
   sending a random access request carrying a first identifier, or sending a random access request and a first identifier,
   receiving a random access response, wherein the random access response carries a second identifier, the second identifier is used to determine whether the random access request is successful; and
   determining that the random access request is successful in a case that the first identifier matches the second identifier,
   wherein, subsequent to receiving the random access response, the random access method further includes: sending a terminal identifier, or second information, or a terminal identifier and second information to a network device; wherein the second information includes a first field, or a second field, or a first field and a second field; the first field comprises at least one of: algorithm identifier information of a first algorithm used when determining the first identifier, time-domain resource information for sending the random access request, a time-domain resource numbering value for sending the random access request, frequency-domain resource information for sending the random access request, a frequency-domain resource numbering value for sending the random access request, preamble information for sending the random access request, a preamble numbering value for sending the random access request, or a network identifier; the second field is a padding value of a preset numeration system used when determining the first identifier;
   wherein subsequent to sending the terminal identifier, or the second information, or the terminal identifier and the second information to the network device, the random access method further comprises: receiving a connection setup complete message or a random access request success message; or, receiving a connection setup failure message or a random access request failure message,
   wherein the connection setup complete message or the random access request success message is sent by the network device in a case that a third identifier obtained by the network device matches the second identifier,
   the connection setup failure message or the random access request failure message was sent by the network device in a case that the third identifier obtained by the network device is different from the second identifier.

2. The random access method according to claim 1, wherein,
   the first identifier is obtained by calculating the terminal identifier, or first information, or the terminal identifier and first information according to the first algorithm; and
   the first information comprises a first field, or a second field, or a first field and a second field.

3. The random access method according to claim 2, wherein,
   the first field or the second field is a fixed-length or variable-length field; or
   the second field is a padding value of a preset numeration system.

4. The random access method according to claim 2, wherein,
   the first field comprises at least one of: algorithm identifier information of the first algorithm used when determining the first identifier, time-domain resource information for sending the random access request, a time-domain resource numbering value for sending the random access request, frequency-domain resource information for sending the random access request, a frequency-domain resource numbering value for sending the random access request, preamble information for sending the random access request, a preamble numbering value for sending the random access request, or a network identifier.

5. The random access method according to claim 1, wherein,
   the first identifier is a first calculation value or a part of a first calculation value, wherein the first calculation value comprises a second calculation value and first information, and the second calculation value is obtained by calculating the terminal identifier or partial information about the terminal identifier according to the first algorithm.

6. The random access method according to claim 2, wherein,
   the first algorithm comprises one of a one-way function algorithm, a hash function algorithm, or an elliptic function algorithm.

7. The random access method according to claim 2, wherein,
   the first information comprises a first field, or a second field, or a first field and a second field;
   the first field or the second field is a fixed-length or variable-length field; or the second field is a padding value of a preset numeration system;

the first field comprises at least one of: algorithm identifier information of the first algorithm used when determining the first identifier, time-domain resource information for sending the random access request, a time-domain resource numbering value for sending the random access request, frequency-domain resource information for sending the random access request, a frequency-domain resource numbering value for sending the random access request, preamble information for sending the random access request, a preamble numbering value for sending the random access request, or a network identifier.

8. The random access method according to claim 1, wherein,
receiving the random access response comprises:
receiving indicator information of a random access request response resource;
receiving a random access request response at a resource location indicated by the indicator information of the random access request response resource;
or,
the second identifier is an identifier selected by a network device from received at least one first identifier sent by at least one terminal, the at least one first identifier comprising the first identifier;
or,
determining that the random access request is successful in a case that the first identifier matches the second identifier comprises:
determining that the random access request is successful in a case that the first identifier is same as the second identifier.

9. A random access method applied to a network device, comprising:
receiving a random access request carrying a first identifier, or receiving a random access request and a first identifier; and
sending a random access response, wherein the random access response carries a second identifier, the second identifier is used to determine whether the random access request is successful, and the random access request is successful in a case that the first identifier matches the second identifier,
wherein subsequent to sending the random access response, the method further comprises: receiving a terminal identifier, or second information, or a terminal identifier and second information sent by a terminal; wherein the second information comprises a first field, or a second field, or a first field and a second field; the first field comprises at least one of: algorithm identifier information of a first algorithm used when determining the first identifier, time-domain resource information for sending the random access request, a time-domain resource numbering value for sending the random access request, frequency-domain resource information for sending the random access request, a frequency-domain resource numbering value for sending the random access request, preamble information for sending the random access request, a preamble numbering value for sending the random access request, or a network identifier; the second field is a padding value of a preset numeration system used when determining the first identifier;

wherein subsequent to receiving the terminal identifier, or the second information, or the terminal and the second information sent by the terminal, the method further comprises:
obtaining a third identifier, and sending a connection setup complete message or a random access request success message in a case that the third identifier matches the second identifier;
or,
obtaining a third identifier, and sending a connection setup failure message or a random access request failure message in a case that the third identifier is different from the second identifier.

10. The random access method according to claim 9, wherein, the second identifier is an identifier selected by the network device from received at least one first identifier sent by at least one terminal, the at least one first identifier comprising the first identifier.

11. The random access method according to claim 9, wherein subsequent to receiving the random access request carrying the first identifier, or receiving the random access request and the first identifier, the method further comprises:
sending indicator information of a random access request response resource; wherein the indicator information is used to instruct a terminal to receive a random access request response at a resource location indicated by the indicator information.

12. The random access method according to claim 9, wherein, before sending the connection setup complete message or the random access request success message in the case that the third identifier matches the second identifier, obtaining the third identifier comprises:
performing, using the first algorithm, calculation on the terminal identifier, or the second information, or the terminal identifier and the second information to obtain the third identifier;
wherein the first algorithm comprises one of a one-way function algorithm, a hash function algorithm, or an elliptic function algorithm.

13. The random access method according to claim 12, wherein content of the second field in the second information used when the third identifier is obtained is same as content of the second field in first information used when the terminal obtains the first identifier.

14. The random access method according to claim 9, wherein, subsequent to sending the connection setup complete message or the random access request success message, the method further comprises:
reporting the terminal identifier, or the second information, or the terminal identifier and the second information to a core network.

15. A communication device, comprising:
a processor and a storage storing a computer program, wherein when the computer program is executed by the processor, the processor performs the method according to claim 1.

16. A communication device, comprising:
a processor and a storage storing a computer program, wherein when the computer program is executed by the processor, the processor performs the method according to claim 9.

* * * * *